Nov. 24, 1970 E. O. OHLSON ET AL 3,541,711
ASSEMBLY FOR EXAMINATION OF X-RAY PHOTOGRAPHS
Filed Feb. 15, 1968 5 Sheets-Sheet 5
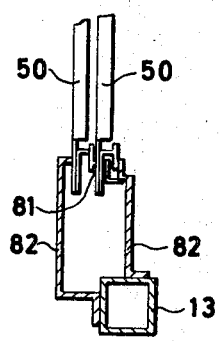
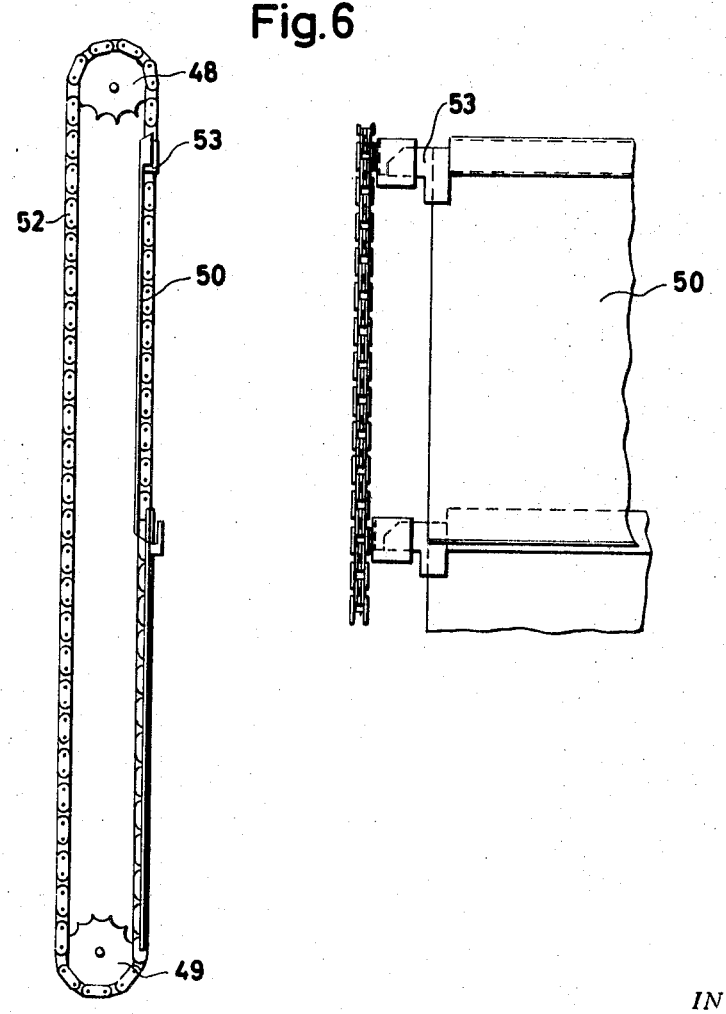
INVENTORS
E. O. Ohlson and C. E. Ohlson
BY
Richards & Geier
ATTORNEYS

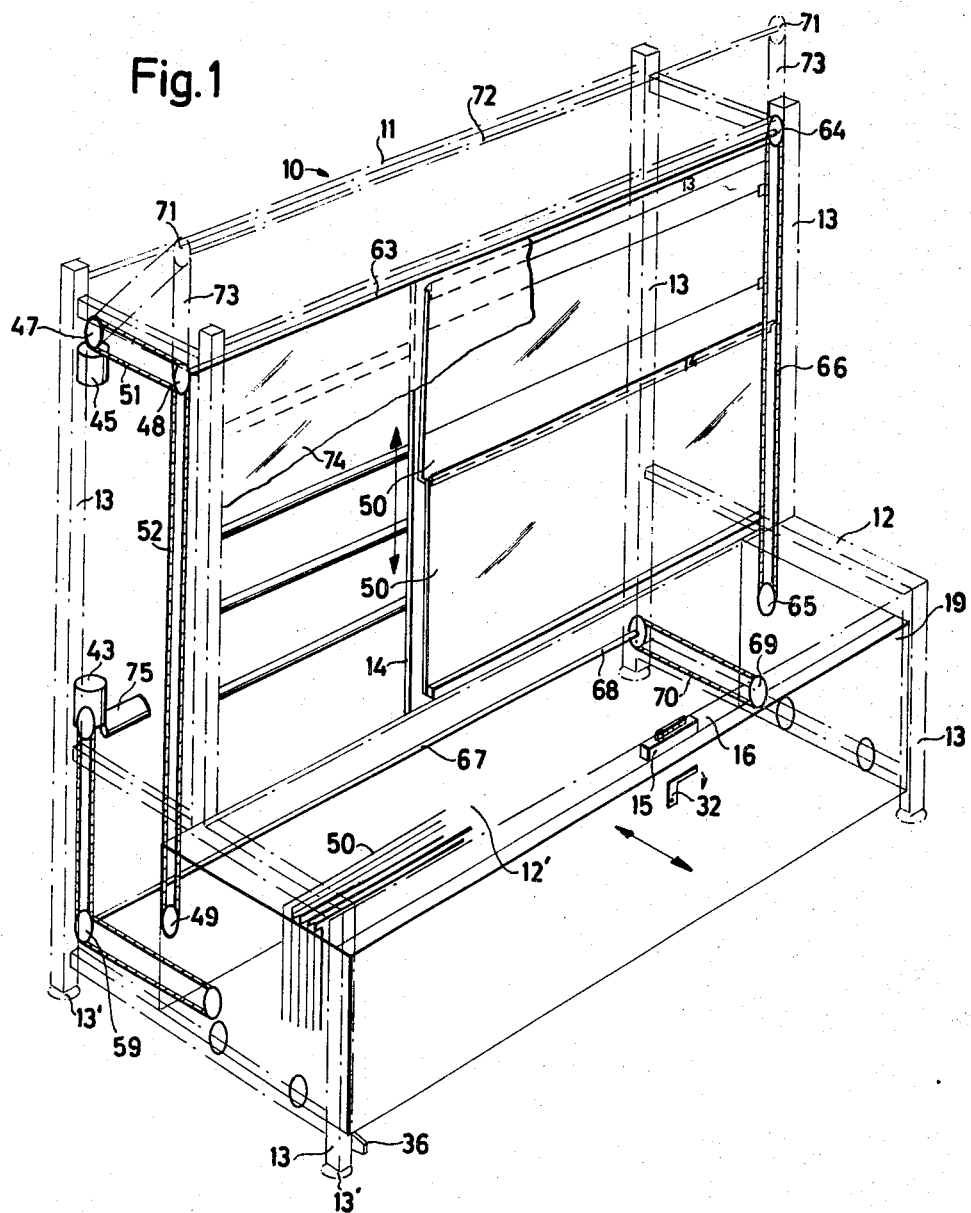

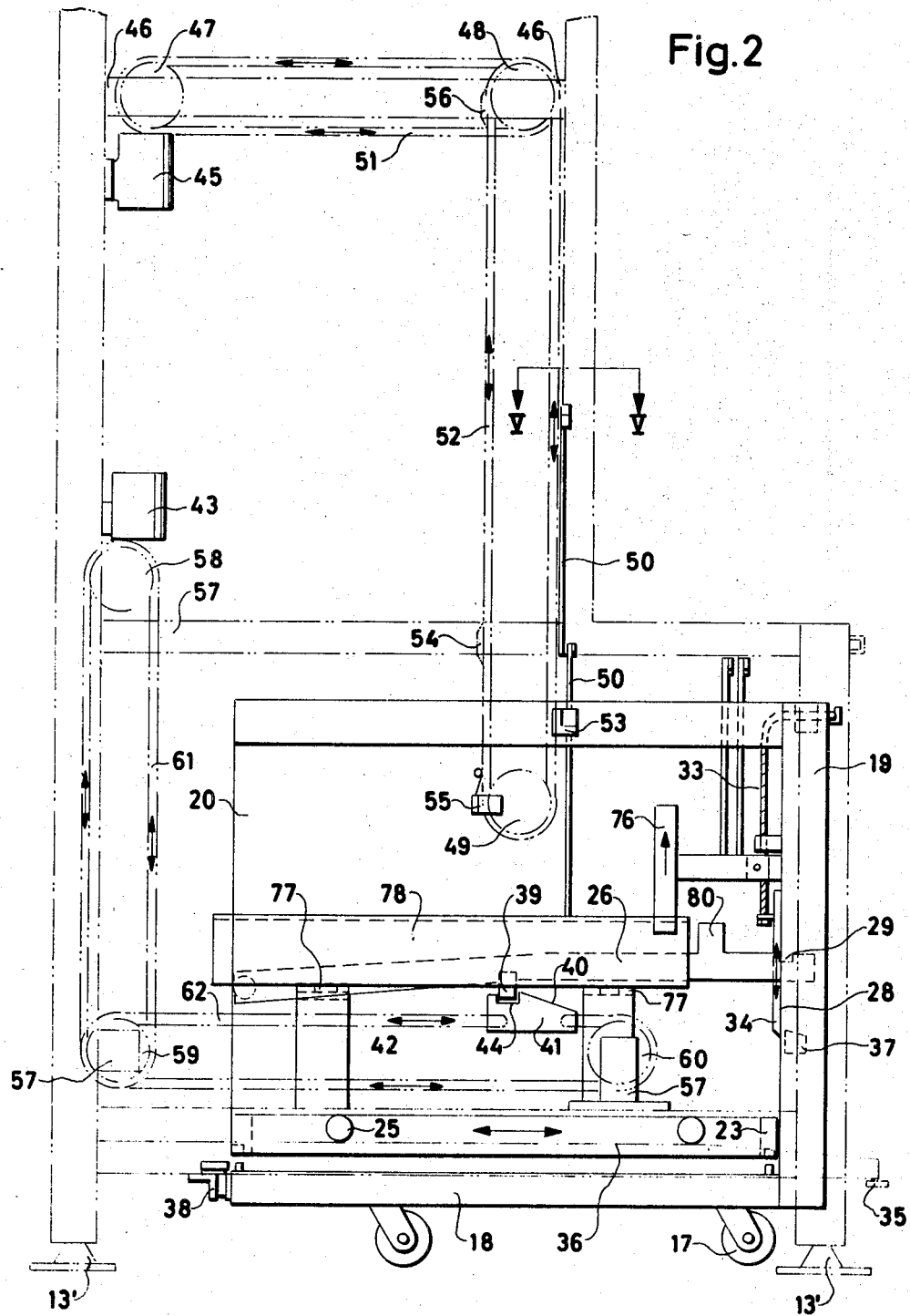

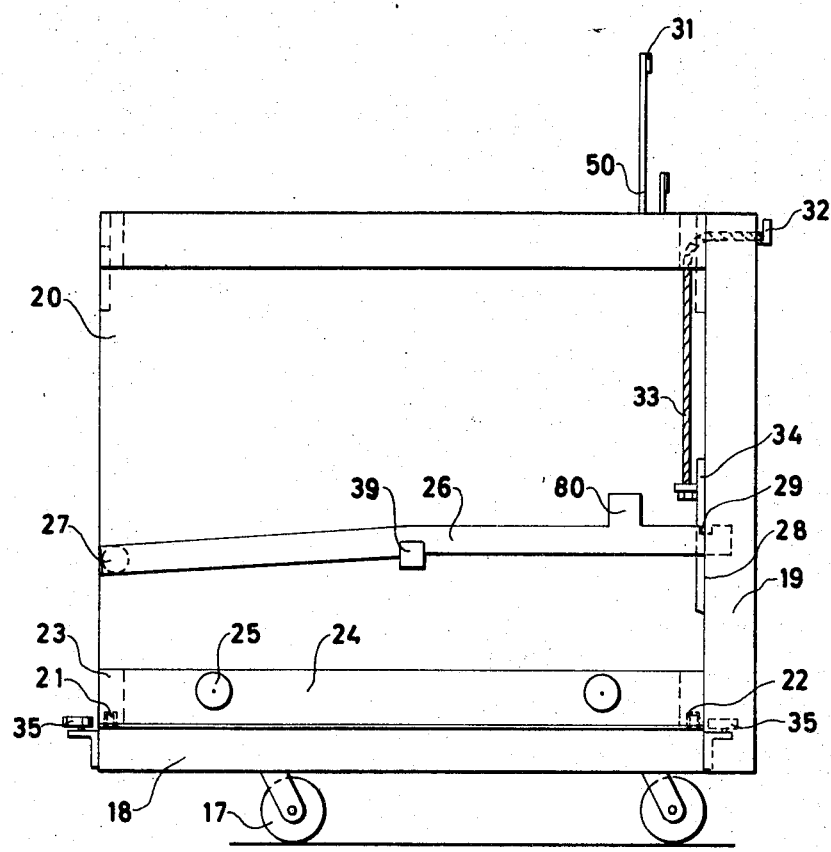

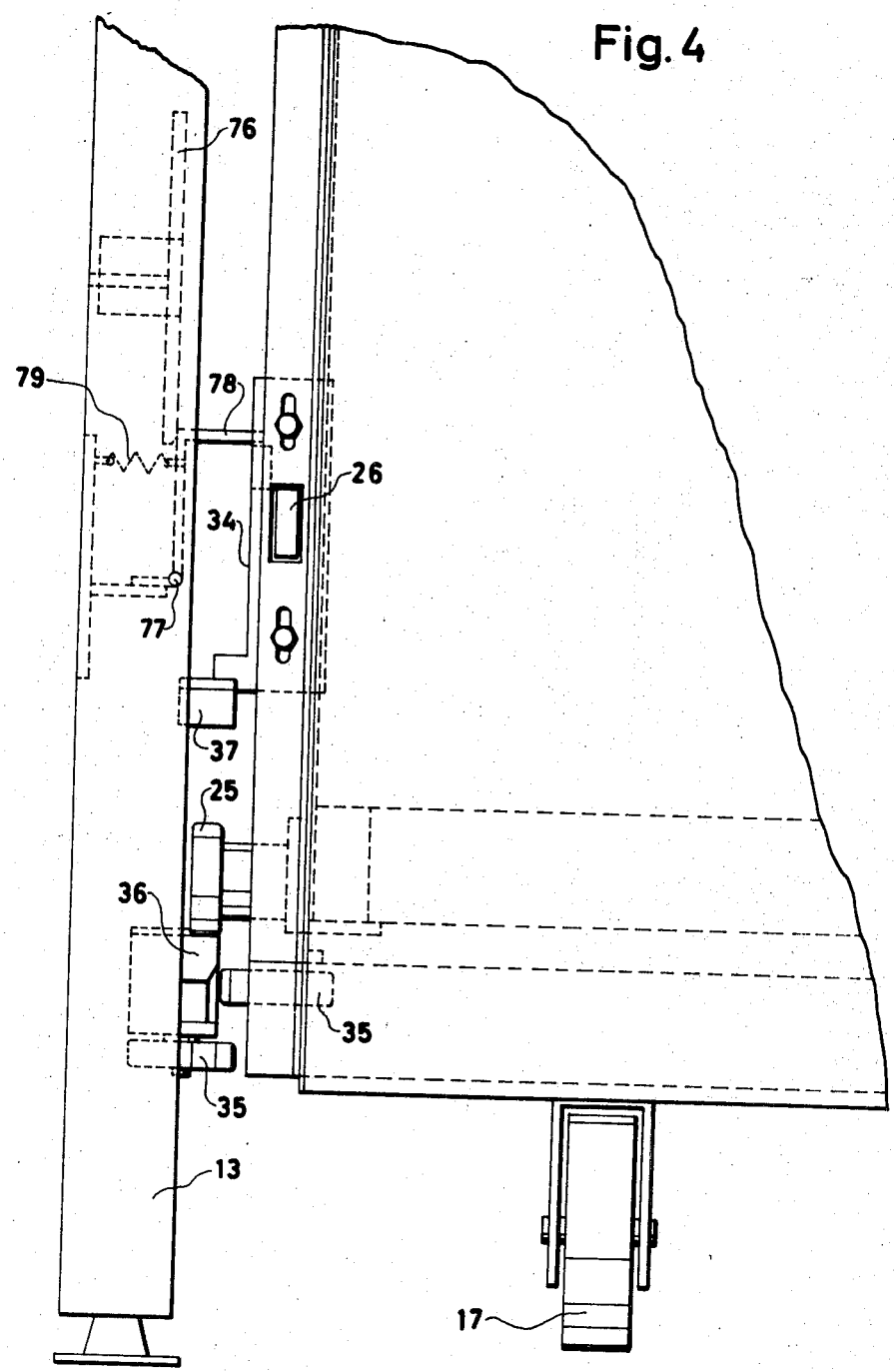

United States Patent Office 3,541,711
Patented Nov. 24, 1970

3,541,711
ASSEMBLY FOR EXAMINATION OF X-RAY PHOTOGRAPHS
Eric Oscar Ohlson, Ankdammsgatan 29, and Carl-Eric Ohlson, Lovgatan 68, both of Solna, Sweden
Filed Feb. 15, 1968, Ser. No. 705,681
Claims priority, application Sweden, Feb. 17, 1967, 2,256/67
Int. Cl. G09f 11/00
U.S. Cl. 40—78.05                          8 Claims

ABSTRACT OF THE DISCLOSURE

An apparatus for the examination of X-ray photographs, wherein a carriage provided with rollers is arranged to support a frames-carrying magazine in detachable mounting in a position of rest. Guide rollers engaging guide rails cooperate during a manual movement of the unit consisting of magazine and carriage to a working position wherein the magazine is automatically released from engagement with the carriage. The magazine is then locked in a position in which it is connected with its driving means. A cabinet provided with a light actuated glass surface is located above the magazine.

---

The present invention relates to an assembly preferably related to the examination of X-ray photographs, which assembly is of the type, comprising a cabinet provided with a light actuated glass surface, below which lighted surface a horizontally movable magazine is serving the purpose to carry a number of rectangular or square frames provided with holding means for X-ray photographs, the assembly further comprising power sources for the movement of the magazine within the cabinet as well as for bringing each required frame from its vertical storage in the magazine into a convenient vertical position for examination in front of the lighted surface of the cabinet. An object of the invention is to provide an arrangement, whereby the frames supporting the X-ray films will be readily accessible for the purpose of their examination, but at the same time fullfilling the requirement that the frames in a simple and easy way can be conveyed to a suitable storage.

Another object of the invention is to provide a simple but efficient arrangement to load the frames supporting the photographs or films and moreover to make it easy also for a person unfamilar with this kind of work to connect the magazine for automatic function, i.e. bring the assembly in serviceable condition.

According to the invention the assembly principally comprises two units, each one being separately transportable, for one part the cabinet with its surface for examination and for another part the magazine with the loose frames inserted, which magazine if so desired can serve the purpose of X-ray photo storage.

According to the invention the carriage is provided with rollers and arranged to carry the magazine in detachable mounting when in rest position, whereby this unit, comprising magazine and carriage, can be introduced below the lighted surface of the cabinet into a working position in such manner that during the manual horizontal displacement of the unit, the magazine by means of guiding rollers is brought in contact with guiding rails of the cabinet, whereby the magazine automatically will be released from engagement with the carriage, whereupon said carriage will occupy a locked rest position below and at a distance from the magazine, said magazine during said horizontal displacement being automatically locked at the same time by locking devices in a position where said magazine is connected with a source of power for its horizontal movement.

According to the invention the carriage and the magazine are detachably connected with each other by means of upwardly pointing pivots in the carriage engaging downwardly pointing bores in the magazine. During the manual displacement of the carriage and the magazine towards a working position, the carriage is arranged to be locked in its rest position by means by locking devices mounted on its lateral upright, which locking devices effectuate the locking behind a lock shoulder, located on one of the legs of the frame of the cabinet, the carriage being blocked at its front end by means of a stop.

Additional characteristics of the invention will be apparent from the following description of an embodiment thereof with reference to the accompanying drawings, in which:

FIG. 1 is a perspective view of the assembly with most of the details omitted, which however can be seen in FIG. 3, FIG. 2 is a side elevational view of the assembly with details of the locking means between magazine and carriage, FIG. 3 shows carriage and magazine in a position outside of the cabinet, FIG. 4 shows a fragmentary front view of the assembly, FIG. 5 is a cross section along line V—V in FIG. 3 showing a pair of frames with their corresponding guiding means arranged in the uprights of the framework of the assembly, and FIG. 6 shows on an enlarged scale the dogs for the vertical transportation of the frames.

With reference to the drawings the assembly as a whole is indicated by 10, and it can be divided into three parts, the first one being cabinet part 11, which is relatively high and provided with a lower desklike front portion 12 with a table top 12', which serves the purpose of working desk and at the same is the place from where the operation is carried out. Cabinet portions 11, 12 form integrating parts of the assembly and are provided with vertical uprights 13 and lower adjustment screw 13'. The front side of cabinet part 11 is the surface of examination of the assembly and is covered by a window 14, behind which light sources, not shown, are arranged.

The operation means of assembly 10 include a push button box 15 connected with the power sources of the assembly, which box is mounted for sliding motion on rail 16 along the whole extension of part 12. Box 15 can be detached from rail 16, thereby permitting the assembly to be operated at a distance from table portion 12.

The second principal part of the assembly is a carriage, provided with guide rollers and comprising a bottom portion 18 and upwardly directed tubular frame details 19, but having no lateral walls.

The third principal part of the assembly is the magazine 20, which is located inside the carriage 18, 19 and detachably connected with said carriage by means of upwardly pointing pivots 21 at the corners, which engage downwardly pointing bores 22 in the magazine 20. The bores 22 are arranged in downwardly pointing shanks 23 extending from the bottom surface 24 of magazine 20. By this design an interspace is formed between the bottom portion 18 of the carriage and the bottom surface 24 of magazine 20, which interspace houses rotatable rollers 25 arranged at the bottom level of said magazine, and by means of which rollers the magazine can be moved independently. Both opposite lateral walls of magazine 20 at a certain distance from the bottom level 24 of said magazine are provided with locking arms 26, an end portion of each arm being fixed to pivoting axis 27. The opposite end portion of each arm is inserted in a slit 28 in upright 19 of the carriage. The front ends of the locking arms 26 are provided with a notch 29. The shaft 27 is a synchronizing axis for the simultaneous vertical movement of locking arm 26, which will be described in greater detail below. The magazine 20 serves to support a certain number of film carrying frames 50, which are of rectangular or square shape and manually removable from magazine 20. The frames 50 rest against the bottom 24 of magazine 20 and are in their upper portion provided with dogs 31. Frames 50 are further guided in the lateral walls of magazine 20 by means of vertical guiding rails not shown.

The vertical upright 19 of the carriage frame is provided with a pivotable handle 32 accessible from the outside, which handle through a wire 33 is connected with a piston 34 vertically displaceable by actuation of handle 32.

During the manual horizontal movement of carriage 18 and magazine 20 from the position showed in FIG. 3 into a position below the surface of examination of cabinet 11, 12, horizontal rotatable guiding rollers 25 provide the proper guidance of the unit formed by parts 18 and 22. Rollers 25 of magazine 20 in the course of the movement will contact guiding rails 36 arranged at the laterals of the cabinet unit, which guiding rails at their front end are conically shaped thereby forming an inclined plane. During the continued horizontal displacement the rollers 25 of the magazine will roll out onto said guiding rails 36, and the first thing to happen is an interruption of the front engagement 21, 22 between carriage 18, 19 and magazine 20. When the pair of rollers 25 at the right side of magazine 20, as in FIG. 3, has covered the whole length of the inclining plane section of guiding rail 36, the contact between carriage 18, 19 and magazine 20 is entirely broken off, and the carriage then occupies a rest position with its rollers 17 on the foundation plane (FIG. 2).

During the horizontal displacement described above, piston 34 of upright 19 of the carriage has moved into contact with shoulder 37 provided with an inclined upper surface and fixed to column 13 of the frame structure. The piston 34 slides up onto said surface and locks behind the shoulder 37. Carriage 18, 19 is now blocked at columns 13 of the frame structure. This blockage is strengthened by a stop 38 rigidly mounted on columns 13 of the frame structure, said stop preventing the carriage from moving further under the cabinet 11.

At the same time the magazine will also be automatically connected with the power sources for its horizontal drive. When, during the displacement described above, rollers 25 of magazine 20 have arrived upon guiding rails 36, downwardly pointing pivots 39 of locking arms 26 will arrive in contact with inclined plane 40 of dog 41, which in itself is a connecting link between the end portions of chain 42, driven by a power source 43. As previously mentioned locking arms 26 can be moved vertically by synchronizing shaft 27, and magazine 20, on the lateral walls of which the locking arms 26 are fixed, can be displaced until its pivots 39 lock in notch 44 of dog 41 in the cabinet part. Magazine 20 is now connected with its power source, and its position then can be indicated as a zero-position or starting point.

POWER SOURCES

There are two power sources. One of them is a reversible electric motor 45 positioned in the upper portion of the assembly taking care of the vertical feed of film carrying frames 50 to the lighted surface 14 of cabinet portion 12 and back again by means of endless chains 51, 52 travelling over sprocket wheels 47, 48, 49 mounted on ears 46. Chain 52 is provided with two dogs 53 spaced at a certain distance from one another on each side of said chain 52 (FIG. 6). Said dogs 53 are arranged to engage the forkshaped dogs 31 of frames 50 for the vertical displacement. In order to make frames 50 stop automatically in desired position in front of window 14, chain 52 is in addition provided with an element 54 for the actuation of limit switch 55. In order to make it possible that, during the transportation of the frames from the point of examination in front of window 14 to the magazine storage, the electric current supply to motor 45 can be interrupted, element 54 is arranged to actuate an additional limit switch 56 located at another point on chain 52.

The power source of magazine 20 is the reversible electric motor 43, which drives magazine 20 by means of chains 61, 62 travelling over sprocket wheels 58, 59, 60 mounted on ears 57, of which chains the one indicated by 62 is provided with an interposed link element forming the earlier described dog 41. As is evident from FIG. 1, sprocket wheel 48 for driving source 45 of frames 50 is connected with a similar sprocket wheel 64 at the opposite lateral wall through a synchronizing shaft 63, which sprocket 64 is connected with sprocket 65 arranged at the same level as sprocket wheel 49. Chain 66 linking sprocket wheels 64 and 65 is provided with dogs (not shown in the drawing) of the same kind as those arranged on chain 52 for engagement with the dog elements of the opposite end portions of the frames.

The power source 43 is also arranged to drive sprocket wheels 68, 69 located at the opposite lateral wall through a synchronizing shaft 67 connected with sprocket wheel 59, said sprockets 68, 69 being linked by endless chain 70.

It is actually possible to increase the vertical height of the field of examination and thereby bring film carrying frames 50 into such a position that an examination can be carried out in a convenient manner either in a sitting or a standing posture in front of table portion 12. The simplest way to make said modification is by arranging additional sprockets 71 at both lateral walls, which sprockets are connected with one another by synchronizing shaft 72. Driving chains 73 thereby connect sprockets 71 with sprockets 48 and 64 respectively positioned below.

In order to shield off surface 14 of examination, a roller blind 74 can be arranged in front of the same.

The automatic function of the assembly is principally controlled by the push buttons of operating push button box 15 by means of programming device 75 connected with magazine motor 43. The design and functional characteristics of programming device 75 are in themselves known and will therefore not be described here.

The assembly functions as follows:

Push button box 75 is provided with a number of manually actuated push buttons carrying numbers, by example from 0 to 30 inclusive, which means that 30 film carrying frames are available. The zero position indicates the only position, in which magazine 20 and carriage 18 can be pulled out of cabinet 11, 12 as will be described below. When a button of push button station 15 is pressed down, programming device 75 is actuated to the effect that, by way of example, frames already in position in front of window 14 are moved down to magazine 20 by means of dogs 53 of chain 52. When the pair of frames have occupied their position in magazine 20, said magazine is automatically subjected to an horizontal displacement until dog 31 of a desired film carrying frame 50 is in position above dog 53 of chain 52. However, frames 50 are arranged to be actuated in pairs during the vertical displacement in such manner that, in case push button number fourteen of push button station 15 has been pressed down, both frame thirteen and frame fourteen will automatically be brought into position for examination in front of window 14. The first dog 53 of chain 52 thereby engages the grip dog 31 of the first frame. When the end portion of said first frame is in position immediately above table top 12', the second dog 53 arranged at the opposite side of the chain engages the second frame 50 of the pair of frames affected, and both said frames are moved, one placed diagonally below the other, until element 54 on chain 52 actuates limit switch 55, so that the pair of frames will occupy the position indicated in FIG. 1.

When magazine 80 together with carriage 18, 19 is taken out of cabinet 11, 12, the carriage is brought to occupy the previously mentioned zero-position (FIG. 1) by pressing down the corresponding button in push button station 15. Thereafter handle 32 is pivoted, whereby locking piston 34 through the connection part 33 moves upwards. Arms 26, one end portion of each one occupying a position inside upright 19 of carriage 18, take part in said movement until notches 29 engage the upper portion of slit 28. During said upwards movement of the arms shoulders 39 at the same time will be released from their engagement with dog 41 of chain 42. Thus the magazine 20 is now connected with the carriage 18, 19 and at the same time disconnected from engagement with its driving source 42. Applying a horizontal pulling force to unit 18, 19 and 20 respectively by means of handle 32, said unit is easily pulled out and its parts will automatically engage each other by pivots 21 and bores 22 during the continued manual pulling movement. Magazine 20 can now be moved independently for storage of its film carrying frames or use in another cabinet for examination situated in another room.

It has been stated above that the so called zero-position is the only one, where magazine 20 and carriage 18, 19 can be manually pulled out of cabinet 11, 12. However, it is important to point out, that, in case of interruption of electric current and irrespective of its relative position below the surface of examination, magazine 20 can be manually taken out in order to make the X-ray films of frames 50 available. For this reason the assembly is provided with a pivotable handle part 76 accessible from a cabinet lateral side, one end of which is attached to the upright 13 and a shank portion of which is arranged to abut against blocking arm 78 pivotable by means of hinges 77, which blocking arm in addition is biased by tension spring 79. Blocking arm 78 cooperates with upwardly pointing shoulders 80 of arms 26, which shoulders normally prevent an undesired sideways horizontal movement of the magazine. Pivoting handle part 76 in direction of the arrow blocking arm 78 is brought out of engagement with locking shoulders 80 and is moved backwards actuated by tension spring 79, thereby pivoting round hinges 77. The magazine can now be manually displaced to the zero-position for the earlier described engagement with carriage 18, 19.

For the sake of clearness it should also be pointed out in this connection that frames 50 are separated from one another by means of wart 81 and they are further arranged to be guided in the vertical uprights 13 of cabinet portion 11 by means of guiding means 82 provided in said uprights. Frames 50 are made of rigid plastic material or the like and are provided with holding devices, not shown, for rapid and simple insertion of the films or photographs.

By adding to the length of the electric cable of push button station 15, the assembly can be controlled also from other rooms or floor levels, and an examination of the film in front of window 14 via an internal television screen is imaginable. The assembly for its maintenance and operation does not require accessibility from behind, and therefore it can be positioned to advantage against a wall or in some other place. It has already been mentioned that the magazine can be taken out independently from the carriage 18, 19 and thus serve the purpose of storage of photographs and films of no immediate interest.

We claim:

1. An assembly for the examination of X-ray photographs and the like, comprising a cabinet having a vertically extending portion and a lower desk-like front portion having a horizontal table top, a lighted glass surface carried by said vertical portion directly above said table top, a carriage, rollers supporting said carriage, a magazine, a plurality of photograph-carrying frames carried by said magazine, means removably mounting said magazine upon said carriage, guide rails carried by said cabinet, guide rollers carried by said magazine and engaging said guide rails to release said magazine from engagement with said carriage when said carriage is moved into a working position below said lighted glass surface, means locking said carriage at a distance from said magazine in said working position, means moving said magazine horizontally within said cabinet to align a selected one of said frames with said lighted glass surface, and means moving said selected frame vertically upwardly into an examining position in front of said lighted glass surface and downwardly into said magazine.

2. An assembly in accordance with claim 1, wherein means removably mounting said magazine upon said carriage comprise upwardly extending pivots carried by said carriage and downwardly extending bore holes provided in said magazine and adapted to receive said pivots.

3. An assembly in accordance with claim 1, wherein means locking said carriage comprising a lock shoulder carried by said cabinet, a piston movably mounted upon said carriage and adapted to engage said shoulder and a stop carried by said cabinet and adapted to engage said carriage.

4. An assembly in accordance with claim 1, comprising at least one arm having one end pivotally mounted in said magazine, a downwardly extending shoulder carried by said arm intermediate the ends thereof, a driving chain, a power source actuating said chain and a dog carried by said chain and adapted to receive said shoulder.

5. An assembly in accordance with claim 4, wherein said carriage comprises an upright member having a slit, the opposite end of said arm extending into said slit and having an upwardly facing notch.

6. An assembly in accordance with claim 1, wherein the guide rails engaged by the guide rollers of the magazine have an inclined ramp at their front end portions for receiving the guide rollers.

7. An assembly in accordance with claim 1, wherein the means moving said frames comprise a plurality of chains, a source of power driving said chains, dogs carried by said chains, said frames having dogs adapted to be engaged by the first-mentioned dogs, and limit switches for stopping said chains.

8. An assembly in accordance with claim 7, wherein the frames in storage position are located close to but not touching each other and wherein the first-mentioned dogs extend perpendicular to and on both sides of their chains.

References Cited

UNITED STATES PATENTS

| 3,201,883 | 9/1965 | Schleisner-Meyer | 40—106.1 |
| 3,246,412 | 4/1966 | Sommerhoff | 40—106.1 |
| 3,362,094 | 1/1968 | Mellander | 40—106.1 |

EUGENE R. CAPOZIO, Primary Examiner

L. R. OREMLAND, Assistant Examiner

U.S. Cl. X.R.

40—106.1